(12) United States Patent
Sawal et al.

(10) Patent No.: US 12,346,788 B2
(45) Date of Patent: Jul. 1, 2025

(54) SYSTEMS AND METHODS FOR GAUGING DIFFERENCES BETWEEN NETWORK CONFIGURATIONS

(71) Applicant: DELL PRODUCTS L.P., Round Rock, TX (US)

(72) Inventors: Vinay Sawal, Fremont, CA (US); Jayanth Kumar Reddy Perneti, Bangalore (IN); Sithiqu Shahul Hameed, Chennai (IN)

(73) Assignee: DELL PRODUCTS L.P., Round Rock, TX (US)

( * ) Notice: Subject to any disclaimer, the term of this patent is extended or adjusted under 35 U.S.C. 154(b) by 1028 days.

(21) Appl. No.: 17/369,760

(22) Filed: Jul. 7, 2021

(65) Prior Publication Data

US 2022/0391662 A1 Dec. 8, 2022

(30) Foreign Application Priority Data

Jun. 4, 2021 (IN) .............................. 202111024965

(51) Int. Cl.
*G06N 3/04* (2023.01)
*G06F 40/126* (2020.01)
*G06F 40/166* (2020.01)
*G06N 3/08* (2023.01)

(52) U.S. Cl.
CPC ............ *G06N 3/04* (2013.01); *G06F 40/126* (2020.01); *G06F 40/166* (2020.01); *G06N 3/08* (2013.01)

(58) Field of Classification Search
CPC .......... G06N 3/04; G06N 3/08; G06F 40/126; G06F 40/166

USPC .......................................................... 706/25
See application file for complete search history.

(56) References Cited

U.S. PATENT DOCUMENTS

| 2015/0101047 A1* | 4/2015 | Sridhara | H04L 63/145 726/23 |
| 2020/0142949 A1* | 5/2020 | Liao | G06F 7/50 |
| 2021/0243210 A1* | 8/2021 | Bernardi | G06F 21/552 |

OTHER PUBLICATIONS

BERT: Pre-training of Deep Bidirectional Transformers for Language Understanding, Devlin et al, 2019 (Year: 2019).*

(Continued)

*Primary Examiner* — Austin Hicks
(74) *Attorney, Agent, or Firm* — BAUGH LAW, LLC

(57) ABSTRACT

Presented herein are embodiments that use a language model to embed or encode configuration elements (e.g., commands, prompts, etc.) into dense, latent representations that incorporate semantic and contextual information. Using a trained language model, a configuration for a network device may be converted into a set of configuration path sentences. Given a first set of encoded configuration path sentences for a first configuration and a second set of encoded configuration path sentences for a second configuration, these two sets may be compared to gauge a degree of difference between the two sets. In one or more embodiments, an Optimal Transport method with Wasserstein distance metric may be used to obtain a comparison value that gauges difference between the two configurations. In one or more embodiments, the comparison valuation may be labeled or classified by comparing the comparison value to one or more pre-defined thresholds.

20 Claims, 13 Drawing Sheets

(56) References Cited

OTHER PUBLICATIONS

Stop Using JSON Config Files, Barral, https://medium.com/trabe/stop-using-json-config-files-ab9bc55d82fa, 2020 (Year: 2020).*

Devlin et al., "BERT: Pre-training of Deep Bidirectional Transformers for Language Understanding," arXiv preprint arXiv:1810.04805, 2019. (16pgs).

Alvarez-Melis & Jaakkola, "Gromov-Wasserstein Alignment of Word Embedding Spaces," Proc. of the 2018 Conf. on Empirical Methods in Natural Language Processing, 2018. (10pgs).

"Dell EMC Smartfabric Director," Dell EMC SmartFabric Director Spec Sheet, Nov. 2020, [online], [Retrieved Jul. 19, 2023]. Retrieved from Internet <URL: https://usermanual.wiki/m/7640f0a83666b1f59fd0a9ed73d59ba7eed788282f79087c8068c00780b6ea96.pdf> (3pgs).

Borman et al., "gRPC Network Management Interface (gNMI)," [online], [Retrieved Jul. 26, 2023]. Retrieved from Internet <URL: https://github.com/openconfig/reference/blob/master/rpc/gnmi/gnmi-specification.md> (34 pgs).

"BERT," Wikipedia, [online], [Retrieved Jul. 19, 2023]. Retrieved from Internet <URL: https://en.wikipedia.org/wiki/BERT_(language_model)> (4pgs).

"Wasserstein distance," Wikipedia, [online], [Retrieved Jul. 19, 2023]. Retrieved from Internet <URL: https://en.wikipedia.org/wiki/Wasserstein_metric> (9pgs).

Pedram Ataee, "How to Compute Sentence Similarity Using BERT and Word2Vec," [online], [Retrieved Jul. 26, 2023]. Retrieved from Internet <URL: https://towardsdatascience.com/how-to-compute-sentence-similarity-using-bert-and-word2vec-ab0663a5d64> Published in Towards Data Seience, Oct. 2020. (10pgs).

Venkata Dikshit, "BERT for unsupervised tasks," [online], [Retrieved Jul. 26, 2023]. Retrieved from Internet <URL: https://medium.com/ether-labs/bert-for-unsupervised-text-tasks-fa6e9ce5d133> Published in ETHER Labs, Jul. 2019. (14 pgs).

Gergely Nemeth, "Bleu-BERT-y: Comparing sentence scores," [online], [Retrieved Jul. 26, 2023]. Retrieved from Internet <URL: https://towardsdatascience.com/bleu-bert-y-comparing-sentence-scores-307e0975994d> Published in Towards Data Science, Oct. 2019. (13pgs).

"K-means Clustering," Wikipedia, [online], [Retrieved Jul. 19, 2023]. Retrieved from Internet <URL: https://en.wikipedia.org/wiki/K-means_clustering> (13 pgs).

* cited by examiner $$y = f\{Wd(\quad,\quad)\}$$

1100

1105

1115

1110

| Config Difference | Action(s) |
|---|---|
| $t_h \leq y \leq 1$ (RED) | Take immediate action |
| $t_l \leq y < t_h$ (YELLOW) | Raise an alert to end user and/or support team |
| $0 \leq y < t_l$ (GREEN) | Differences are within limits. No action required |

SYSTEMS AND METHODS FOR GAUGING DIFFERENCES BETWEEN NETWORK CONFIGURATIONS

CROSS-REFERENCE TO RELATED APPLICATION

This patent application claims priority benefit under 35 USC § 119 to the Indian Patent Application Number 202111024965, filed in the Indian Patent Office on 4 Jun. 2021, entitled "SYSTEMS AND METHODS FOR GAUGING DIFFERENCES BETWEEN NETWORK CONFIGURATIONS," and listing Vinay Sawal, Jayanth Kumar Reddy Perneti, and Sithiqu Shahul Hameed as inventors, which patent document is incorporated by reference herein in its entirety and for all purposes.

BACKGROUND

A. Technical Field

The present disclosure relates generally to information handling systems. More particularly, the present disclosure relates to systems and methods for gauging differences between network configurations.

B. Background

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Networks are growing increasingly larger and increasingly more complex. To add to the complexity, networking devices are drastically denser in terms of bandwidth and features that are supported. To help with this increasing complexity, fabric management tools are provided that enable customers to design, configure, deploy, expand, and manage fabrics. An example of such a tool is the SmartFabric Director (SFD) produced by Dell EMC of Round Rock, Texas. The Dell EMC SmartFabric Director dramatically simplifies the definition, provisioning, monitoring and troubleshooting of physical underlay fabrics with intelligent integration, visibility, and control for virtualized overlays. Another feature of this network orchestration solution is that it enables organizations to synchronize the deployment of a physical switch fabric with the virtual network and gain comprehensive visibility at both the physical and virtual network layers. As the only fabric management platform co-developed with VMware, SmartFabric Director provides customers with a single, cohesive view across both physical and virtual environments for operations, management, and troubleshooting. This co-engineered solution offers an integrated approach to control, visibility, and analytics, with orchestration tools from VMware and other third parties. Intent-based auto-provisioning and enhanced visibility and management between virtual and physical network environments ensure that day-to-day operations of the physical and virtual layers of the core networks are synchronized.

FIG. 1 illustrates an example depiction of an SFD interface 100 related to a deployment, for example, a leaf-spine fabric, which comprises two spine nodes 105-1 and 105-2 and a number of leaf nodes 110-$x$. The SFD may be used to deploy the depicted fabric running a network operating system using integrated protocols (e.g., gNMI/Openconfig) to configure individual elements of the fabric based on the intent specified by the system/network operator.

In deploying and configuring the fabric or a device in the fabric, a configuration file may be used that contains the configuration. Typically, the network operating software employed in the fabric supports multiple north-bound interfaces (NBI) to configure the device. Consider, by way of example, the architecture depicted in FIG. 2. As shown in the architecture illustration 200, the following north-bound interfaces 220 are currently available: command line interface (CLI) 205, RESTConf: a REST-like interface for NetConf 210, and gNMI: gRPC-based Openconfig interface that may be accessed via a management tool such as SFD 215. When a management tool, like SFD, is managing a network device, it uses a gNMI interface 215/225 to perform CRUD (create, read, update, delete) operations to configure the device. Preferably, this interface acts as a "single source of truth" for the fabric configurations; ideally, all other north-bound interfaces are disabled while SFD is controlling the network devices (represented by OS Apps 230-$x$).

While every attempt is made to disable all other NBIs when a management tool is controlling a network device, due to the sheer number of CLIs available and the general nature of NBI architectures, there is always a possibility that a user may be able to configure the device via these unblocked NBIs. This action causes the management tool's view of the fabric to go out-of-sync with what is currently configured in the fabric since there is no reconciliation of configurations between management tool's configuration (which may be referred to as a "golden configuration") and the fabric's actual configuration (which may be referred to as its "running configuration"). This issue has a myriad number of negative down-stream effects on the fabric management and overall network stability. This issue is sometimes referred to as configuration drift.

This problem is not unique to just management tool implementations. For example, a similar problem exists when trying to determine differences between configurations. Any system, whether it is a single device or a fabric, may find itself in this situation due to the changes, such as even minor tweaks, that Network Admins perform as a part of day-to-day administration.

For at least these reasons, there is a need to identify or gauge difference between configurations and/or to assess whether one or more actions should be taken based on the severity of the differences.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

FIG. 11 graphically depicts a comparison of two difference matrices via a distance function to obtain comparison value or values, according to embodiments of the present disclosure.

DETAILED DESCRIPTION OF EMBODIMENTS

Figure 1:
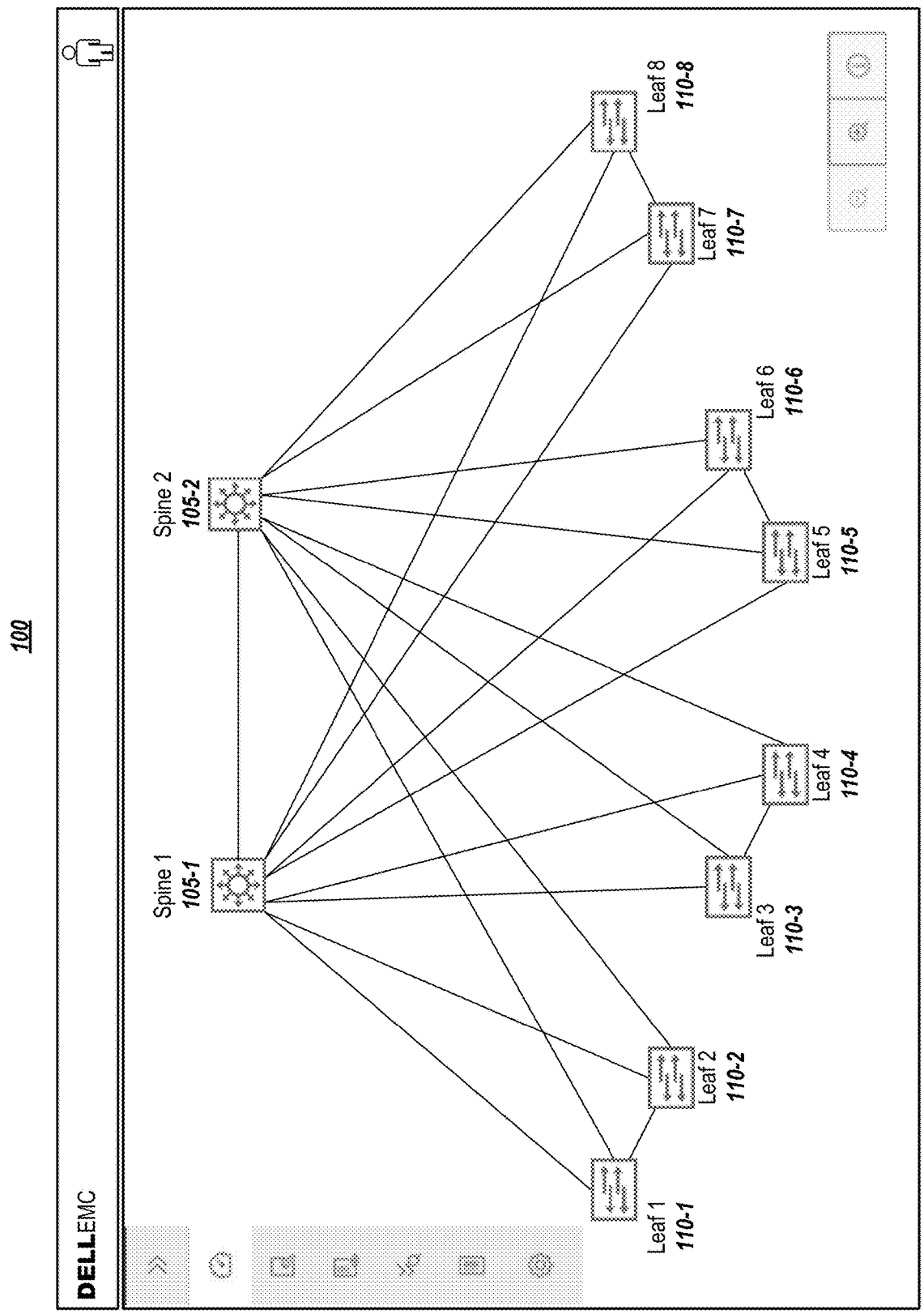
FIG. 1 ("FIG. 1") illustrates an example depiction of a fabric management platform interface 100 related to a deployment.
Figure 2:
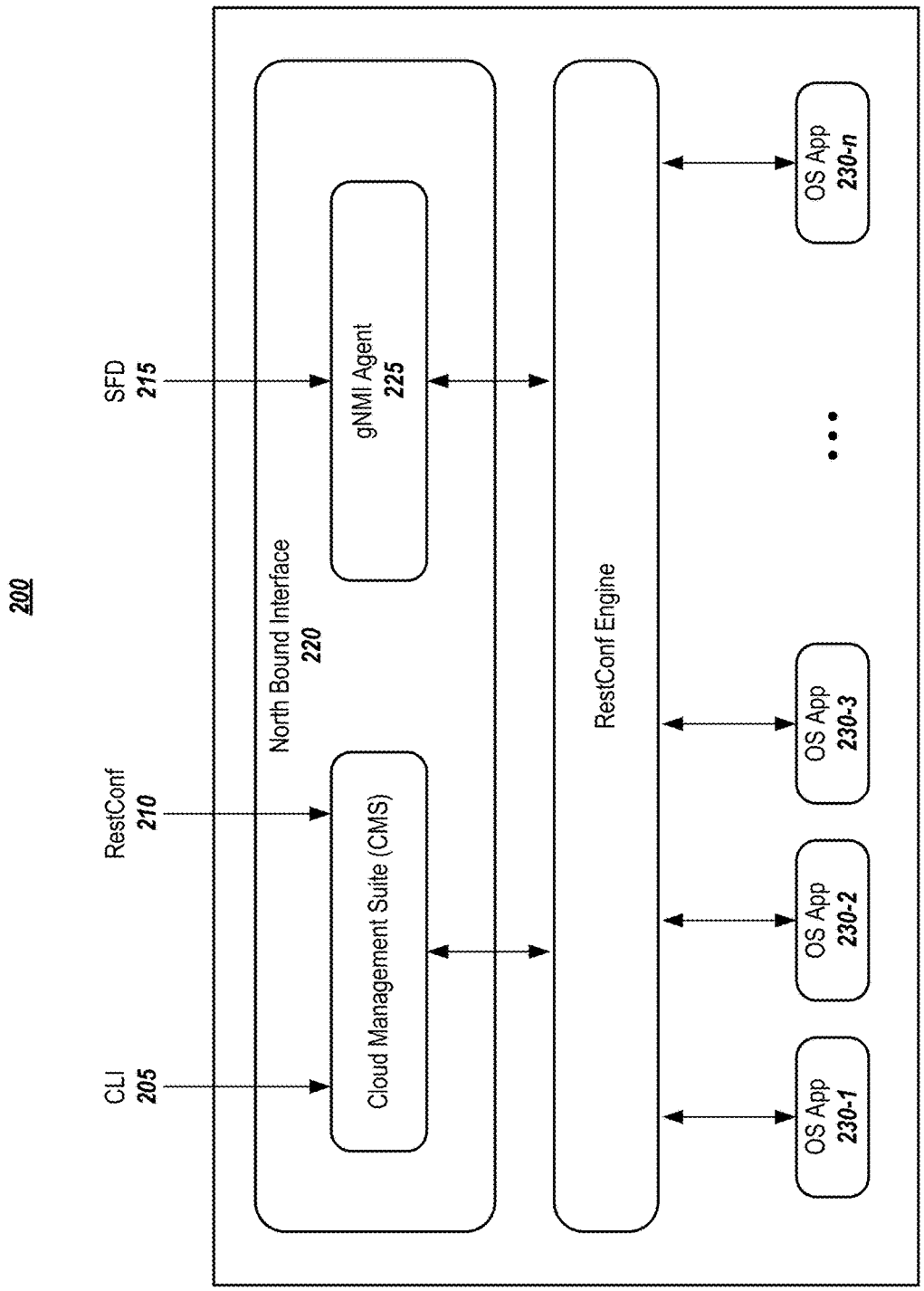
FIG. 2 depicts an interface architecture.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms, and any examples are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to system component or components into which information may be entered or otherwise recorded. The terms "data," "information," along with similar terms, may be replaced by other terminologies referring to a group of one or more bits, and may be used interchangeably. The terms "packet" or "frame" shall be understood to mean a group of one or more bits. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell." The words "optimal," "optimize," "optimization," and the like refer to an improvement of an outcome or a process and do not require that the specified outcome or process has achieved an "optimal" or peak state.

It shall be noted that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

In one or more embodiments, a stop condition may include: (1) a set number of iterations have been performed; (2) an amount of processing time has been reached; (3) convergence (e.g., the difference between consecutive iterations is less than a first threshold value); (4) divergence (e.g., the performance deteriorates); and (5) an acceptable outcome has been reached.

It shall be noted that any experiments and results provided herein are provided by way of illustration and were performed under specific conditions using a specific embodiment or embodiments; accordingly, neither these experiments nor their results shall be used to limit the scope of the disclosure of the current patent document.

It shall also be noted that although embodiments described herein may be within the context of configurations, aspects of the present disclosure are not so limited. Accordingly, the aspects of the present disclosure may be applied or adapted for use in other contexts.

A. Introduction

1. General Background Context Information

Because computer networking is a critical function in modern society, it is important that the configuration of information handling system nodes and connections (or links), which together form the network fabric, be correct. Due to the complexity of modern network designs, a number of tools have been created to help in the design, operation, management, and/or troubleshooting of physical & virtual network topologies. As noted above, one such tool is the SmartFabric Director (SFD), by Dell Technologies Inc. (also Dell EMC) of Round Rock, Texas, which dramatically simplifies the definition, provisioning, monitoring, and troubleshooting of physical underlay fabrics with intelligent integration, visibility, and control for virtualized overlays.

This tool may be used to implement a configuration on a network information handling system. As noted above, a problem can occur if the configuration in the SFD, which is used for various functions, including management, diverges from the actual configuration of an information handling system. Thus, the management tool's view of the fabric to go out-of-sync with what is currently configured in the fabric since there is no reconciliation of configurations between the management tool's configuration (e.g., a "golden configuration") and the fabric's actual configuration (e.g., a "running configuration"). This issue has a myriad number of negative down-stream effects on the fabric management and overall network stability.

Also as noted above, this problem is not unique to just management tool implementations. For example, a similar problem exists when trying to determine differences between configurations. Any system, whether it is a single device or a multi-device fabric, may find itself in this situation due to the changes, such as even minor tweaks, that Network Admins perform as a part of day-to-day administration. Thus, being able to determine difference between configurations can be important for effective network management.

Current approaches to determine differences between two configuration files are limited, cumbersome, and computationally expensive. For example, one approach is to perform trivial, brute force text comparison (e.g., regex, diff, etc.) between two configurations. For example, a naïve approach is to take a diff between the running configuration in the system and a golden configuration. This approach provides the string literal differences between the two systems. However, such an approach has deficiencies. For example, it does not take into consideration the "importance" of the string difference. Some significant differences have little or no effect, but other differences—even if small—can produce critical issues. Consider, by way of example, the following:

Difference: Hostname configuration; Impact: Trivial—No change in device functionality.

Difference: Description/Comments; Impact: Trivial—No change in device functionality.

Difference: IP-addr/VLAN change; Impact: Significant—Major change in device functionality Difference: Service-level agreement parameters (QoS, ACL, etc.): Impact: Significant—Major change in device functionality An edit-distance-based method is another way to determine the difference between words. However, it also suffers from the same issues in that it does not comprehend the latent contextual information from the configuration when trying to determine the distance/drift between the two compared configurations.

Finally, it should be noted that difference may be found by manually inspecting two configurations. However, this approach has several drawbacks. First, it is very labor intensive and costly. Some configuration files can be quite lengthy—which is a problem that is likely to worsen as information handling systems continue to become more complex and supporting each revision. To painstakingly review these very increasing, lengthy files by hand is costly, in terms of at least time and employee costs. Second, even the most attentive reviewer will make mistakes. Third, to have effective review, the reviewers typically are required to have domain knowledge/expertise to determine the intensity of drift and is time consuming. Finding such skilled reviews may be a challenging problem.

2. General Introduction to Embodiments

In one or more embodiments, Natural Language Processing (NLP) is used to map configuration information into a common latent space. Using NLP approaches allows for semantic and contextual information to be reflected in the encoding of the configuration data. Given configurations encoded into representations, a comparison technique, such as an Optimal transport technique with Wasserstein distance, utilizes semantic and contextual information from the configurations to determine a config-drift difference between two configurations, such as a "golden-config" and a "running-config." In one or more embodiments, the comparison is expressed in the form of a real-valued function that quantifies the difference.

B. Systems and Methods Embodiments

Figure 3:
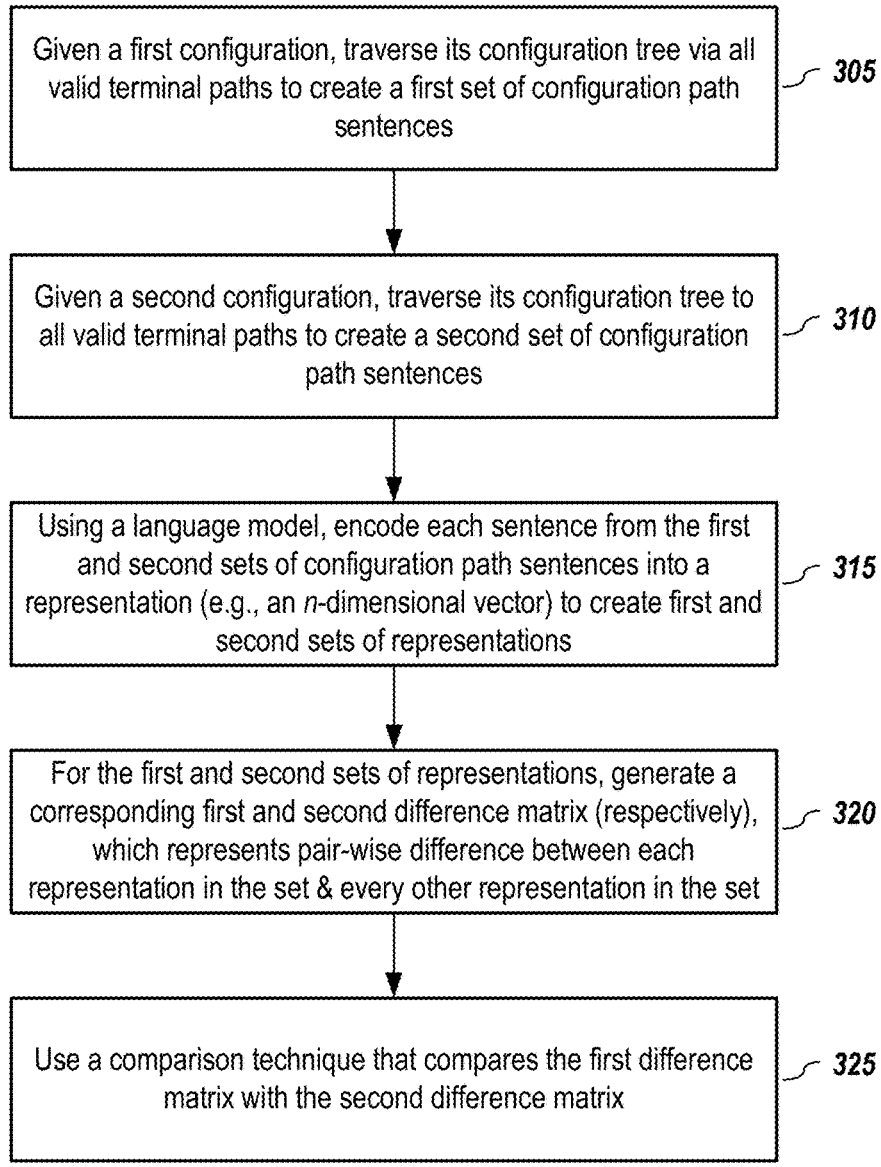
FIG. 3 depicts a method for gauging difference between two configurations, according to embodiments of the present disclosure.

FIG. 3 depicts a method for gauging difference between two configurations, according to embodiments of the present disclosure. In one or more embodiments, given a first configuration, its configuration tree is traversed (305) via all valid paths to create a first set of configuration path sentences. That is, each valid path is used to create a corresponding configuration path sentence. It shall be noted that throughout this work, a "sentence" may be any set of text, rather than an actual linguistic sentence.

Similarly, given a second configuration, the second configuration's tree is traversed (310) through all valid terminal paths to create a second set of configuration path sentences.

Figure 4:
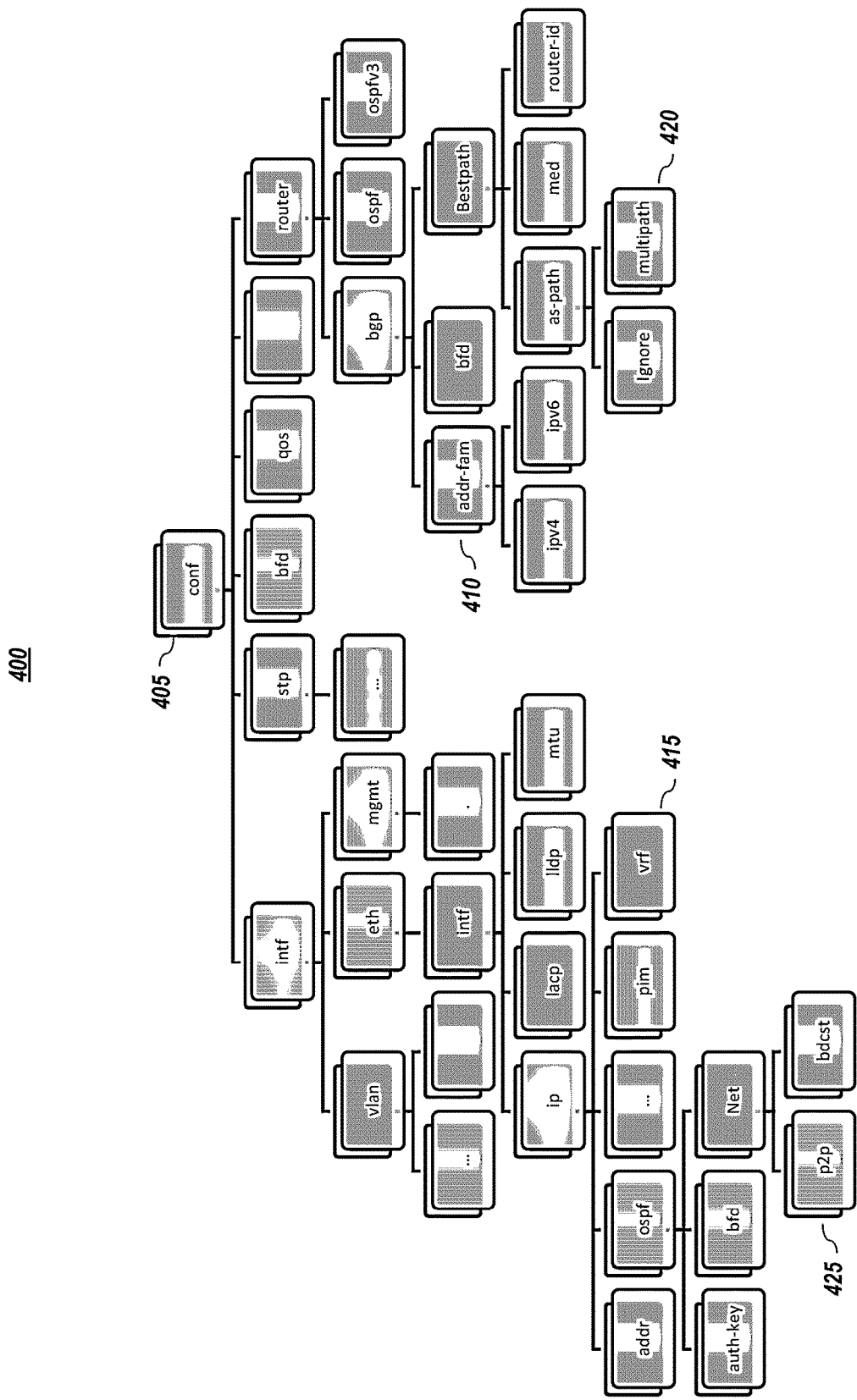
FIG. 4 graphically illustrates an example configuration tree for a configuration, according to embodiments of the present disclosure.

FIG. 4 graphically illustrates an example configuration tree for a configuration, according to embodiments of the present disclosure. Note that it has a root node 405, a number of intermediate nodes (e.g., node 410 and node 415) and a number of terminal or leaf nodes (e.g., node 420 and node 425).

Figure 5:
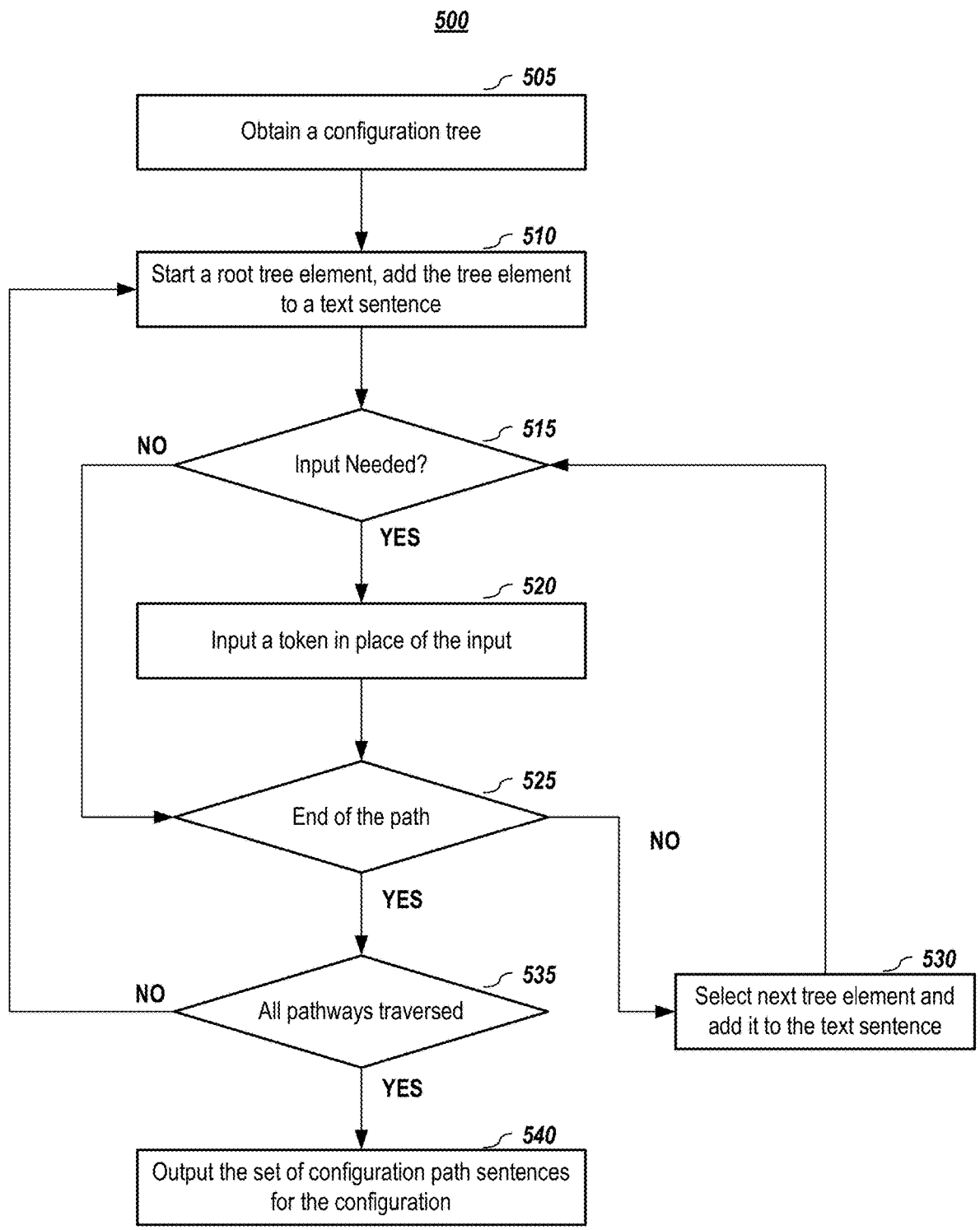
FIG. 5 depicts a method for traversing the tree structure to generate a set of configuration path sentences, according to embodiments of the present disclosure.

FIG. 5 depicts a method for traversing the tree structure to generate a set of configuration path sentences, according to embodiments of the present disclosure. After obtaining (505) a configuration tree, one starts at the root node (e.g., node 405 in FIG. 4) and adds (510) its tree element (e.g., "conf" in this example) to a new configuration path sentence. Some tree elements may expect (515) an input. In one or more embodiments, if the tree element requires an input, an input token (e.g., <token1>) may be used (520) in place of the input. In one or more embodiments, the token may be a generic token that is used in all instances. Alternatively, the token may be related to the expected input; thus, if different tree elements have inputs that are the same or similar, the same or similar placeholder tokens may be used to help bolster contextual information.

Once that tree element and any input(s) have been added to the configuration path sentence, the process may check (525) to determine whether the path is at its terminal node. If the terminal/leaf node has not been added to the sentence, the next tree element is selected (530) and the process returns to step 515.

If the terminal/leaf node has been processed, the process may check (535) to determine whether another path is to be processed. If another pathway is yet to be traversed, the process returns to step 510. However, if all valid pathways have been traversed, the process may then output (540) the set of configuration path sentences for this configuration. Thus, the process of FIG. 5 creates a set of unique sentences.

Some example configuration path sentences are as follows:

router bgp <token1> addr-family ipv4 unicast
    interface ethernet <token1> mtu <token2>
    interface ethernet <token1> switchport mode trunk allowed vlan <token2>

It shall also be noted that, in one or more embodiments, only valid pathways may be considered. Certain configurations or settings may be checked to determine whether a tree element is valid or not. If not valid, that pathway may be skipped. Example of non-valid pathways include a tree element that is not supported by the device, a tree element that is not used for a particular deployment or configuration, an obsoleted tree element, etc.

While not depicted in FIG. 5, a check may be made to determine if another configuration is to have a set of configuration path sentence generated, and if so, the process of FIG. 5 may be repeated with the next configuration.

Returning to FIG. 3, given one or more sets of configuration path sentences, a language model may be used (315) to encode each configuration path sentence from the first and second sets of configuration path sentences into a representation (e.g., an n-dimensional vector) to create first and second sets of representations. Thus, every sentence has a representation value that represents its position relative to all other sentences.

In one or more embodiments, a language model may be trained that maps a "sentence" to a fixed-length vector. This vector encodes the meaning of the sentence and may be used for downstream tasks. Example language models that may be used include, but are not limited to, models such as BERT (Bidirectional Encoder Representations from Transformers) and MUM (Multitask Unified Model). Such models generate a probability distribution by encoding the inputs into an n-dimensional numeric representation that contains contextual and semantic information. Thus, in the n-dimensional latent space, every sentence has a point-value that represents its position (in the n-dimensional latent space) relative to all other sentences, and "distance" between two sentences may be construed as a measure of similarity/relatedness between two sentences.

In one or more embodiments, in a pretraining phase, a Masked Language Model (MLM) task and a Next Sentence Prediction (NSP) task are trained together, with the goal of minimizing the combined loss function of the two tasks. MLM involves the model predicting a token for an input token in a sentence that has been omitted (i.e., masked).

For NSP, in the training process, the model receives pairs of sentences as input and learns to predict if the second sentence in the pair is the subsequent sentence in the original document. In one or more embodiments, a context window setup may be used for the NSP task, in which each pair of sentences occurring within a window of n sentences may be labeled as 1 and labeled as 0 otherwise. It shall be noted that a "sequence" (such as an input sequence input into the language model) may be understood to mean a single sentence or two sentences together, and that a "sentence" may be any set of text, rather than an actual linguistic sentence.

Figure 6:
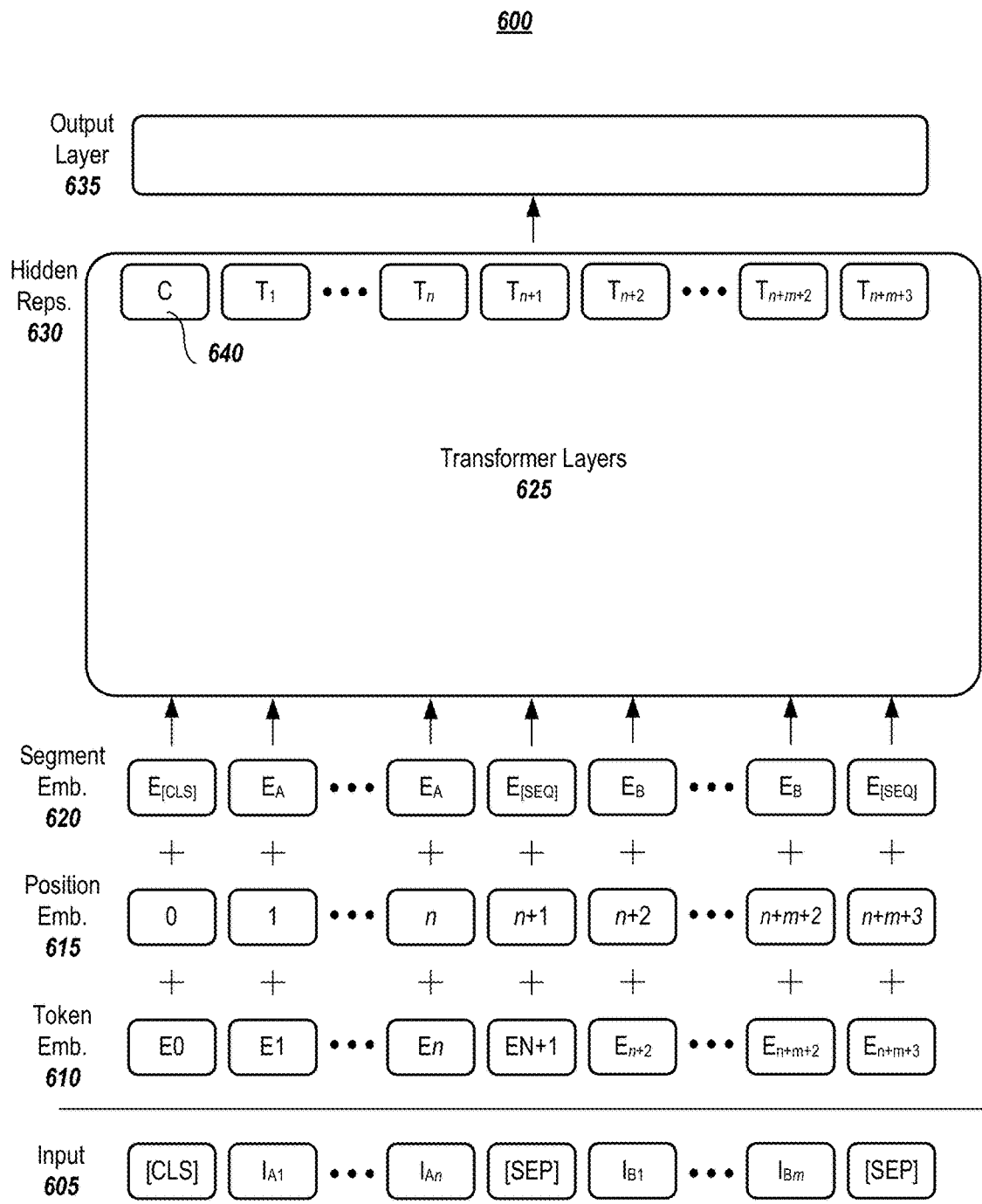
FIG. 6 depicts the architecture for a language model, according to embodiments of the present disclosure.

FIG. 6 depicts the architecture for a language model, according to embodiments of the present disclosure. Input into the language model, is a set of input tokens 605, which may be the configuration path sentence is generated above. The input tokens may include special tokens such as [CLS], which indicates a classification token, and [SEP], which indicates a separation token. In one or more embodiments, the input 605 is converted into a series of embeddings. In the depictive example, there are three embeddings: token embedding 610, position embedding 615, and segment embedding 620. In one or more embodiments, the token embeddings may be obtained from pre-trained word embeddings. The position embeddings represent the sequential position of the token in the input, and the segment embeddings represent what type the input token is. For example, the segment embedding may indicate if the input token is a special token, from one sentence, or from another sentence. In one or more embodiments, these various embeddings may be concatenated as an input into the core 625 of the language model. As illustrated in FIG. 6, the core of the language model is a set of transformer layers 625 that, through several neural network layers, convert the embeddings into a final set of hidden representations 630. It shall be noted that one of the representations outputs (i.e., C 640) represents a summary of the input tokens.

In one or more embodiments, every input configuration path sentence may be represented as an n-dimensional vector. In one or more embodiments, this vector may be the summary token C 640, may be a combination of the hidden representations for the input at the final hidden layer (e.g., concatenation or sum of $T_1$-$T_n$), may be a combination of the hidden representations for the input at an intermediate hidden layer (e.g., the language model may comprise encoder-decoder structure and the output for the encoder(s) may be used as the representation), or the language model may comprise one or more additional layers (e.g., output layer 635, which may include a feedforward layer) that allows for additional training and learning capacity for the model 600. Regardless of the implementation, each configuration path sentence is converted to a dense representation. Using such a technique, the feature-level context of a given configuration path sentence is acquired without any manual intervention and/or rule generation.

Figure 7:
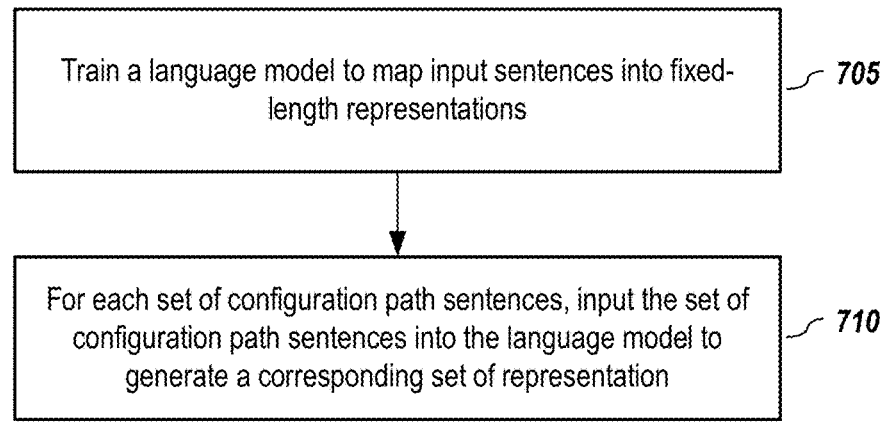
FIG. 7 depicts a method for training and using a language model, according to embodiments of the present disclosure.

FIG. 7 depicts a method for training and using a language model, according to embodiments of the present disclosure. In one or more embodiments, the language model is trained (705) to map input sentences into fixed-length representations. It shall be noted that the training may be multiple stages or single stage. For example, the language model may be pre-trained on a corpus, may be pre-trained on a corpus but also finetune with domain-specific data (e.g., configuration path sentences), or may be trained completely with domain-specific data. In one or more embodiments, the initial corpus may be general sentences, or may be more specific to domain used herein (e.g., technical sentences) so that less adaption/transfer learning and finetuning is needed to improve final performance. Having trained the language model, it may then be used to generate (710) a set of representations corresponding to the input set of configuration path sentences.

Figure 8:
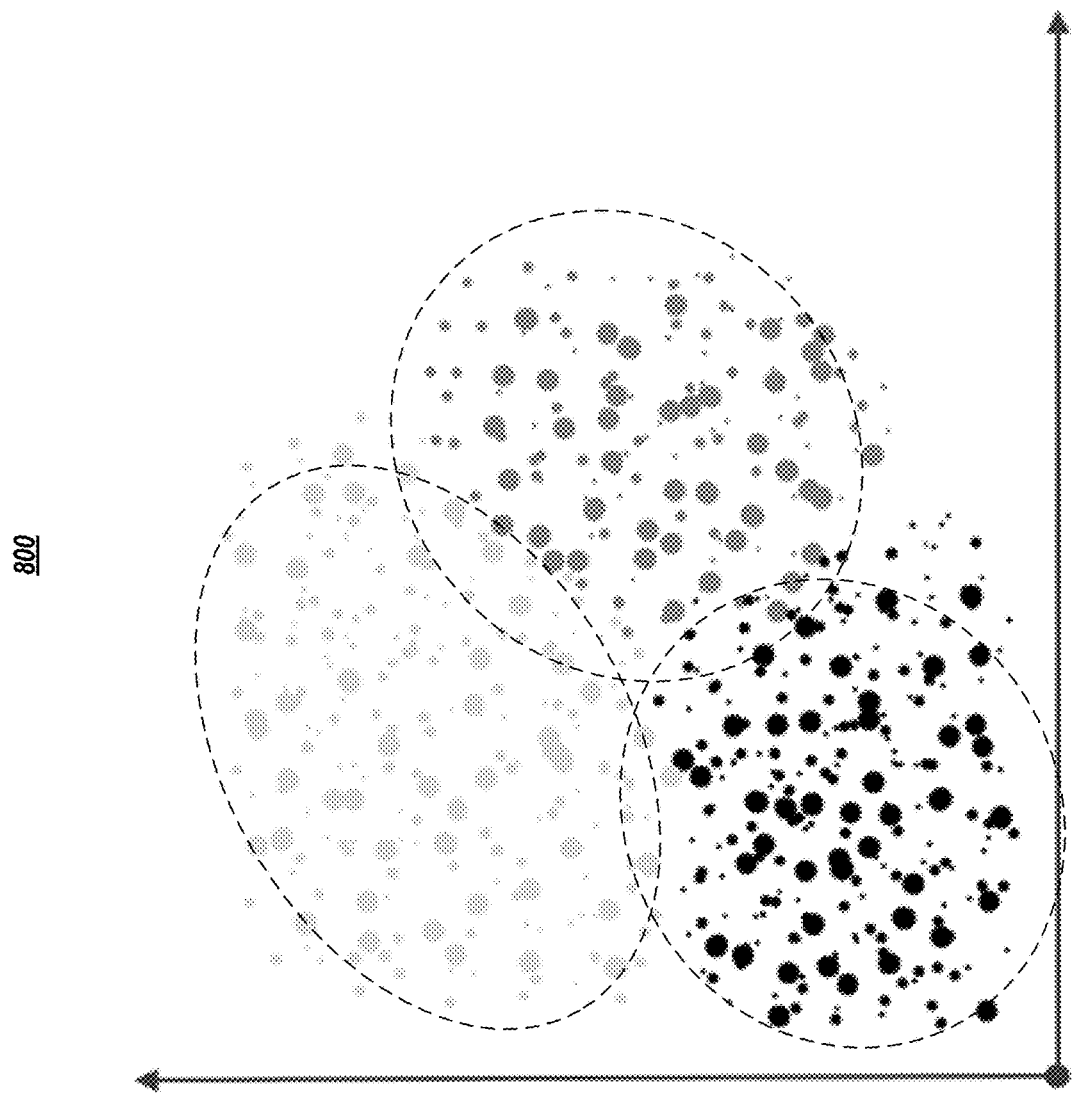
FIG. 8 depicts a set of two-dimensional representations clustered into three groups, according to embodiments of the present disclosure.

It shall be noted that having the inputs as a n-dimensional representation provides a number of benefits. For example, the representations in a set of representations may be clustered. FIG. 8 depicts a set of two-dimensional representations clustered into three groups, according to embodiments of the present disclosure. Each dot represents an encoded configuration path sentence in two-dimensional space, and distance between two dots within the distribution represent at least semantic similarity between the two sentences. Clustering may be performed using partitioning-based methods (e.g., k-means clustering), hierarchical-based clustering, fuzzy clustering, grid-based clustering, density-based clustering, or model-based clustering. Clustering may be used to show relatedness, for grouping (e.g., types or functions of configuration paths—e.g., display/show, config, exec, etc.), for identifying outliers, and for other reasons.

It shall be noted that clustering may be used to obtain a group embedding that may be used for comparison. For example, in one or more embodiments, k-means clustering may be performed with relatedness score as a similarity metric on sentence representations. The sentence segments closest to each centroid may be used as the sentence embedding candidate. This process may be repeated until convergence.

Also, it shall be noted that clustering of more than one set of configurations may be performed. Such clusters may be used to divide the comparison process by analyzing the differences in distributions between two sets of configuration path sentences by looking at only a cluster (i.e., subsets of the sets).

Returning to FIG. 3, given that each of the first and second sets of representations is a distribution of n-dimensional points, comparison may be made between the two sets. In one or more embodiments, the distribution of the first set may be compared to the distribution of the second set to gauge difference. Alternatively, in one or more embodiments, the distribution that is compared may be a meta-distribution. For example, for each of the first and second sets of representations, a corresponding first difference matrix and a second difference matrix (respectively) may be generated (320). In one or more embodiments, the difference matrix represents pair-wise difference between each representation in the set with every other representation in the same set.

Figure 9:
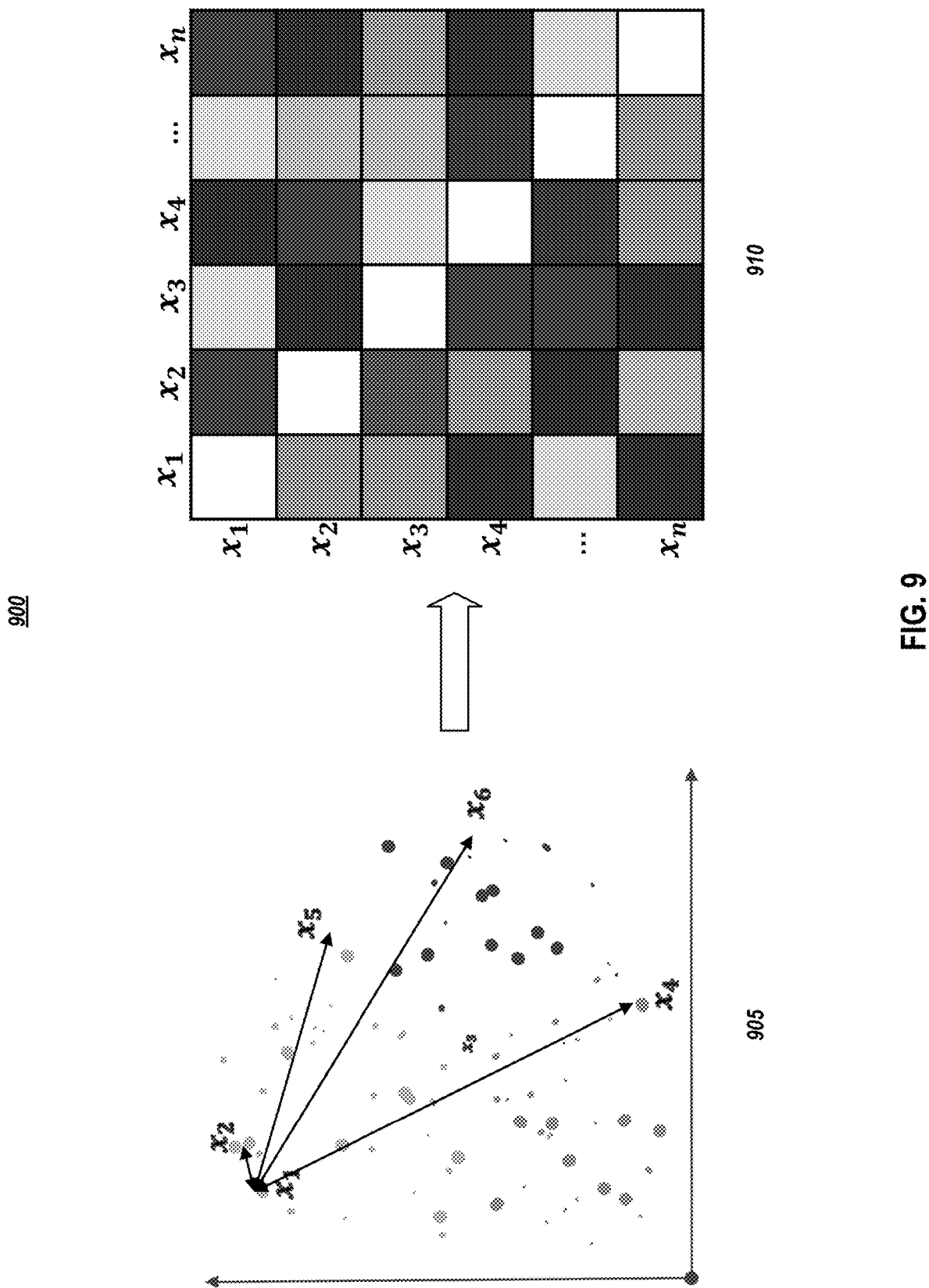
FIG. 9 graphically illustrates generation of a difference matrix, according to embodiments of the present disclosure.

FIG. 9 graphically illustrates generation of a difference matrix, according to embodiments of the present disclosure. The graph 905 depicts a 2D set of representations and the grid 910 represents the distance matrix. As illustrated a configuration path sentence representation (e.g., x1) is compared with every other representation (e.g., x2, x3, x4 . . . ). Their differences are stored in a difference matrix, such as the graphically depicted one 910 in FIG. 9. Note that this matrix represents a distribution of the difference of the set of representations. One or more distance measures may be used, such as Euclidean distance, Manhattan distance, Minkowski distance, Hamming Distance, Cosine similarity, Jaccard similarity or distance, etc.

Returning to FIG. 3, given either the native distributions of the first and second sets of representations, or their difference matrices, or both, one or more comparison techniques may be employed to compare the two configurations. In one or more embodiments, Kullback-Leibler (KL) divergence may be used. KL divergence is a measure of how one distribution is different from a second distribution.

Alternatively, an Optimal Transport technique may be applied to the two probability distributions to identify the contextual configuration difference between them. Optimal Transport formalizes the problem of finding a minimum cost mapping between two point-sets, viewed as discrete distributions. Traditional Optimal Transport assumes two spaces are registered/aligned (i.e., that the axes are in direct correspondence). But, this assumption typically fails in the real world as when the axes rotates. And, it may not be possible to know what the axes alignment is or should be. To handle the above limitations, a Wasserstein distance with Optimal Transport may be used.

Thus, in one or more embodiments, using a Wasserstein distance metric and Optimal Transport technique, the two distance matrices may be normalized and compared. Formally, two empirical distributions with $\{x_1, x_2, \ldots x_n\} \in \mathbb{R}^n$ and $\{y_1, y_2, \ldots y_m\} \in \mathbb{R}^m$ where $x_i$ and $y_j$ are discrete points representing sentence embeddings or are discrete points that represent comparison between two points (i.e., Wasserstein distance values in a difference matrix) are defined as:

$$\mu = \Sigma_i^n p_i \delta_{x_i} \text{ and } \nu = \Sigma_j^m q_j \delta_{y_j}$$

where p and q are vector of probability weights associated with each point-set. In one or more embodiments, uniform weights $$p_i = \frac{1}{n} \text{ and } q_j = \frac{1}{m}$$

may be used although other weights may be used—such as the frequency of words. This representation allows weighting "importance" to some sentences over other sentences depending on the probability of occurrence in a probability distribution space, the importance of the sentence, etc. A transportation map, T, may be realized as:

$$\inf_T \left\{ \int_X c(x, T(x)) d\mu(x) | T_\# \mu = \nu \right\}$$

where the cost $c(x, T(x))$ is $\|x - T(x)\|$ and $T_\#\mu = \nu$ implies that points from one distribution (i.e., the source) exactly map to the target points, which may not exist. Thus, a relaxed Kantorovich formation may be used, in which case the set of transportation plans is a polytope:

$$\Pi(p,q) = \{\Gamma \in \mathbb{R}_+^{n \times m} | \Gamma \mathbb{1}_n = p, \Gamma^T \mathbb{1}_n = q\}$$

The cost function may be given by $C_{ij} = \|x^{(i)} - y^{(j)}\|$, and the total cost incurred by $\Gamma$ is $\langle \Gamma, C \rangle := \Sigma_{ij} \Gamma_{ij} C_{ij}$.

It shall be noted that other formulations for Optimal Transport may be used.

Figure 10:
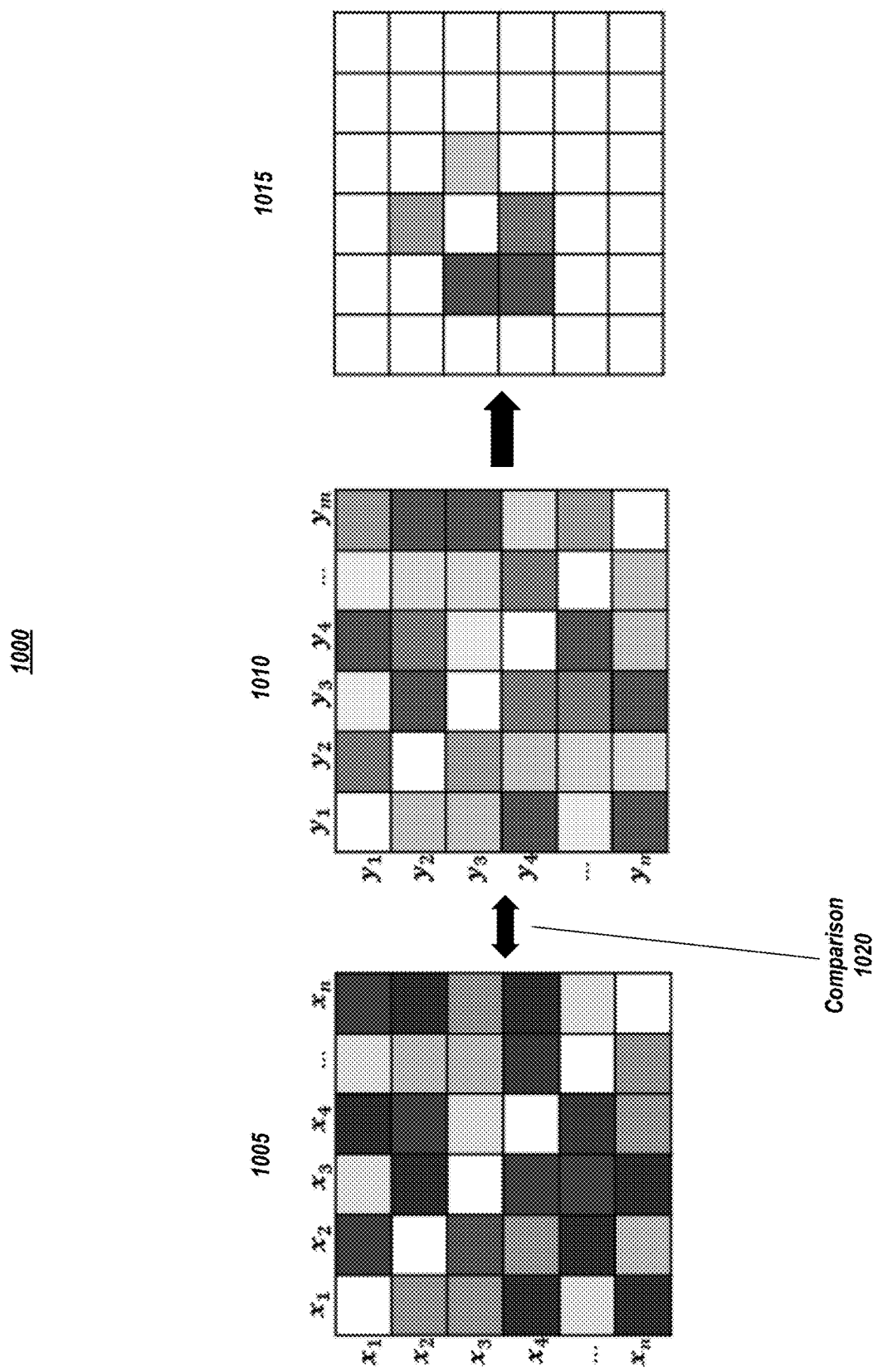
FIG. 10 graphically depicts a comparison between a first difference matrix 1005 and a second difference matrix to produce comparison valuation (e.g., matrix 1015), according to embodiments of the present disclosure.

FIG. 10 graphically depicts a comparison 1020 between a first difference matrix 1005 and a second difference matrix 1010 to produce comparison valuation (e.g., matrix 1015), according to embodiments of the present disclosure. As noted above, the comparison may comprise using a Wasserstein distance metric and Optimal Transport technique to obtain a comparison value.

In one or more embodiments, if the size of one difference matrix is larger than the other difference matrix, the smaller matrix may have filler cells added so that the two difference matrices are equal size for comparison purposes.

In one or more embodiments, the comparison valuation may be a real-valued score ($0.0 \leq score \leq 1.0$) that measures the difference between the two distributions. In one or more embodiments, a Normalized Matrix Norm method, such as Frobenius Norm or 2-norm, may be used to find the distance between two matrices. Such a score represents the contextual drift between a first configuration (e.g., a golden configuration) and a second configuration (e.g., a currently running configuration). The larger the distance between the two distributions, the bigger the configuration drift between the configurations.

In one or more embodiments, different threshold values may be set, and one or more actions may be assigned to threshold ranges. Using a qualitative policy, appropriate action can be taken to mitigate the effects of configuration drift. For example, FIG. 11 graphically depicts the comparison of the two difference matrices 1110 and 1115 via a distance function that converts to a final comparison value 1105, according to embodiments of the present disclosure. Also illustrated in FIG. 11 is a table 1150 that presents varying threshold ranges and corresponding actions:

A score above a certain threshold ($t_h \leq score \leq 1.0$) may be considered "red" level 1120, and one or more immediate actions are to be taken 1135.

A score in-between two thresholds ($t_k \leq score < t_h$) may be considered "yellow" level 1125, and an action such as alerting a user, admin, and/or support team may be taken 1140.

A score below a certain threshold ($0.0 \leq score < t_1$) may be considered "green" level 1130, and no action may need to be taken 1145.

It shall be noted that different, fewer, or more categories/thresholds may be used. Additionally, or alternatively, the one or more corrective actions may involve making a change or changes based upon classification(s) identified by the neural network system.

C. System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more drives (e.g., hard disk drives, solid state drive, or both), one or more network ports for communicating with external devices as well as various input and output (I/O) devices, such as a keyboard, mouse, stylus, touchscreen, and/or video display. The computing system may also include one or more buses operable to transmit communications between the various hardware components.

Figure 12:
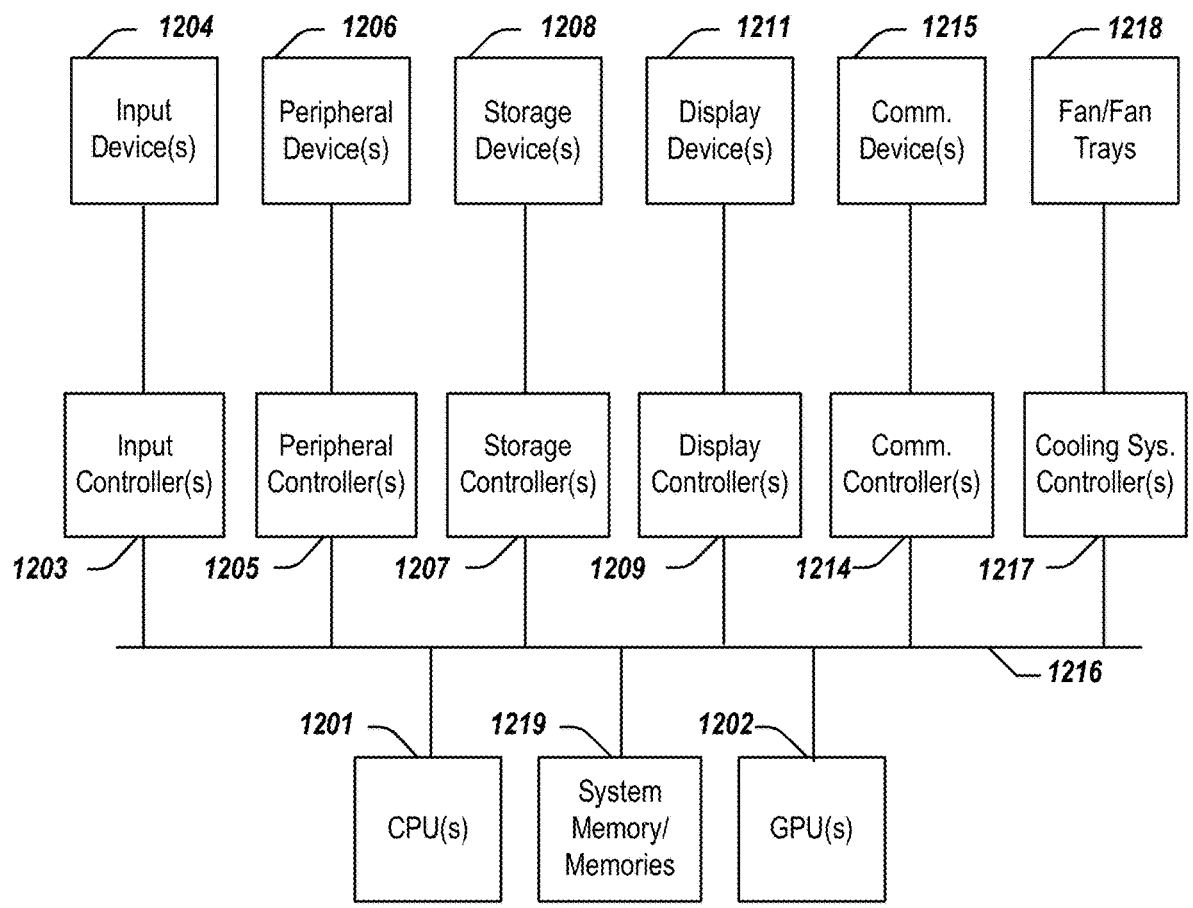
FIG. 12 depicts a simplified block diagram of an information handling system, according to embodiments of the present disclosure.

FIG. 12 depicts a simplified block diagram of an information handling system (or computing system), according to embodiments of the present disclosure. It will be understood that the functionalities shown for system 1200 may operate to support various embodiments of a computing system—although it shall be understood that a computing system may be differently configured and include different components, including having fewer or more components as depicted in FIG. 12.

As illustrated in FIG. 12, the computing system 1200 includes one or more central processing units (CPU) 1201 that provides computing resources and controls the computer. CPU 1201 may be implemented with a microprocessor or the like and may also include one or more graphics processing units (GPU) 1202 and/or a floating-point coprocessor for mathematical computations. In one or more embodiments, one or more GPUs 1202 may be incorporated within the display controller 1209, such as part of a graphics card or cards. The system 1200 may also include a system memory 1219, which may comprise RAM, ROM, or both.

A number of controllers and peripheral devices may also be provided, as shown in FIG. 12. An input controller 1203 represents an interface to various input device(s) 1204, such as a keyboard, mouse, touchscreen, and/or stylus. The computing system 1200 may also include a storage controller 1207 for interfacing with one or more storage devices 1208 each of which includes a storage medium such as magnetic tape or disk, or an optical medium that might be used to record programs of instructions for operating systems, utilities, and applications, which may include embodiments of programs that implement various aspects of the present disclosure. Storage device(s) 1208 may also be used to store processed data or data to be processed in accordance with the disclosure. The system 1200 may also include a display controller 1209 for providing an interface to a display device 1211, which may be a cathode ray tube (CRT) display, a thin film transistor (TFT) display, organic light-emitting diode, electroluminescent panel, plasma panel, or any other type of display. The computing system 1200 may also include one or more peripheral controllers or interfaces 1205 for one or more peripherals 1206. Examples of peripherals may include one or more printers, scanners, input devices, output devices, sensors, and the like. A communications controller 1214 may interface with one or more communication devices 1215, which enables the system 1200 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 1200 comprises one or more fans or fan trays 1218 and a cooling subsystem controller or controllers 1217 that monitors thermal temperature(s) of the system 1200 (or components thereof) and operates the fans/fan trays 1218 to help regulate the temperature.

In the illustrated system, all major system components may connect to a bus 1216, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, for example: magnetic media such as hard disks, floppy disks, and magnetic tape; optical media such as compact discs (CDs) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Figure 13:
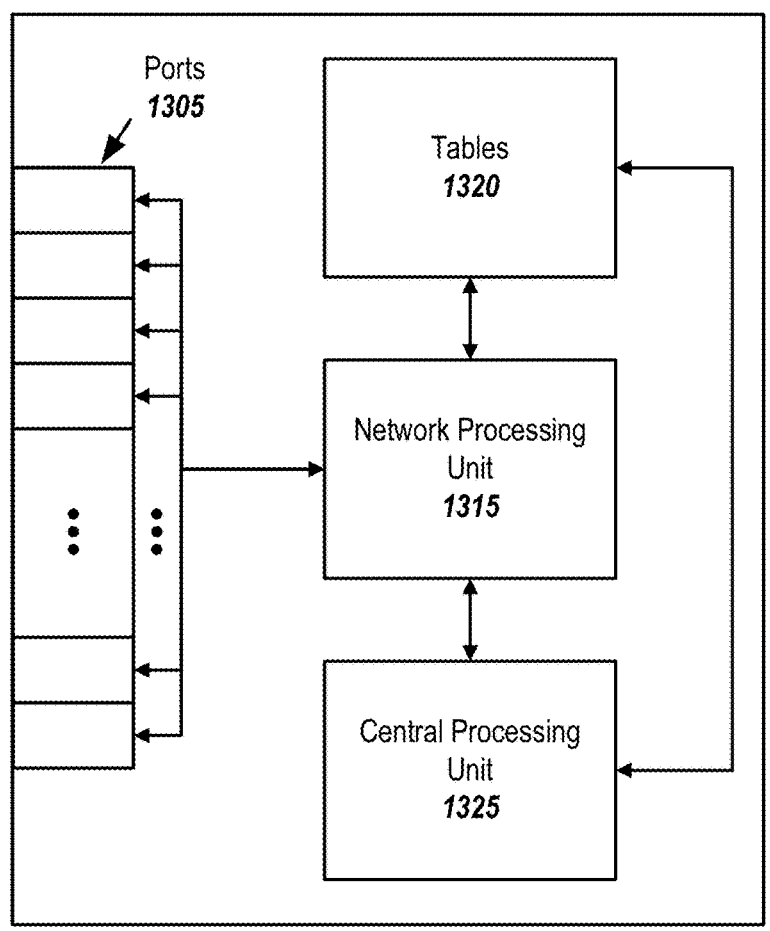
FIG. 13 depicts an alternative block diagram of an information handling system, according to embodiments of the present disclosure.

FIG. 13 depicts an alternative block diagram of an information handling system, according to embodiments of the present disclosure. It will be understood that the functionalities shown for system 1300 may operate to support various embodiments of the present disclosure—although it shall be understood that such system may be differently configured and include different components, additional components, or fewer components.

The information handling system 1300 may include a plurality of I/O ports 1305, a network processing unit (NPU) 1315, one or more tables 1320, and a central processing unit (CPU) 1325. The system includes a power supply (not shown) and may also include other components, which are not shown for sake of simplicity.

In one or more embodiments, the I/O ports 1305 may be connected via one or more cables to one or more other network devices or clients. The network processing unit 1315 may use information included in the network data received at the node 1300, as well as information stored in the tables 1320, to identify a next device for the network data, among other possible activities. In one or more embodiments, a switching fabric may then schedule the network data for propagation through the node to an egress port for transmission to the next destination.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as CDs and holographic devices; magneto-optical media; and hardware devices that are specially configured to store or to store and execute program code, such as ASICs, programmable logic devices (PLDs), flash memory devices, other non-volatile memory (NVM) devices (such as 3D XPoint-based devices), and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A processor-implemented method for gauging difference between two configurations, the method comprising:

encoding, using a trained neural network language model, each configuration path sentence from a first set of configuration path sentences related to a first configuration into a first set of representations, in which the trained neural network language model converts the configuration path sentence into the representation;

encoding, using a trained neural network language model, each configuration path sentence from a second set of configuration path sentence related to a second configuration into a second set of representations, in which the trained neural network language model converts the configuration path sentence into the representation;

for the first set of representations, generating a first difference matrix, which represents pair-wise comparisons between each representation in the first set of representations and every other representation in the first set of representations;

for the second set of representations, generating a second difference matrix, which represents pair-wise comparisons between each representation in the second set of representations and every other representation in the second set of representations;

generating a comparison valuation using a comparison technique to gauge difference between the first difference matrix with the second difference matrix;

correlating the comparison valuation to a configuration difference label; and causing one or more actions to be taken based upon the correlated configuration difference label.

2. The processor-implemented method of claim 1 wherein the first set of configuration path sentences and the second set of configuration path sentences are obtained by performing steps comprising:
   generating a configuration path sentence corresponding to a valid path of a first configuration tree for the first configuration, in which the valid path spans from a root node in the first configuration tree to a terminal or end node in the first configuration tree and a token is inserted in the configuration path sentence when an input is expected; and
   generating a configuration path sentence corresponding to a valid path of a second configuration tree for the second configuration, in which the valid path spans from a root node in the second configuration tree to a terminal or end node in the second configuration tree and a token is inserted in the configuration path sentence when an input is expected.

3. The processor-implemented method of claim 2 wherein:
   the trained neural network language model that converts the configuration path sentence of the first set of configuration path sentences into the representation is a same trained neural network language model that converts the configuration path sentence of the second set of configuration path sentences into the representation.

4. The processor-implemented method of claim 1 wherein the comparison technique is a Wasserstein distance-based Optimal transport to obtain a minimum cost mapping between the first and second difference matrices.

5. The processor-implemented method of claim 1 wherein the comparison valuation is a scalar value.

6. The processor-implemented method of claim 5 further comprising:
   correlating the comparison valuation to a configuration difference label based upon the scalar value and a set of one or more threshold values; and
   identifying one or more actions corresponding to the correlated configuration difference label.

7. The processor-implemented method of claim 1 further comprising:
   responsive to a number of elements in the first difference matrix being different than a number of elements in the second difference matrix, filling whichever difference matrix has fewer elements with filler elements so that each difference matrix has the same number of elements.

8. An information handling system comprising:
   one or more processors; and
   a non-transitory computer-readable medium or media comprising one or more sets of instructions which, when executed by at least one of the one or more processors, causes steps to be performed comprising:
      encoding, using a trained neural network language model, each configuration path sentence from a first set of configuration path sentences related to a first configuration into a first set of representations, in which the trained neural network language model converts the configuration path sentence into the representation;
      encoding, using a trained neural network language model, each configuration path sentence from a second set of configuration path sentence related to a second configuration into a second set of representations, in which the trained neural network language model converts the configuration path sentence into the representation;
      for the first set of representations, generating a first difference matrix, which represents pair-wise comparisons between each representation in the first set of representations and every other representation in the first set of representations;
      for the second set of representations, generating a second difference matrix, which represents pair-wise comparisons between each representation in the second set of representations and every other representation in the second set of representations; and
      generating a comparison valuation using a comparison technique to gauge difference between the first difference matrix with the second difference matrix.

9. The information handling system of claim 8 wherein the first set of configuration path sentences and the second set of configuration path sentences are obtained by performing steps comprising:
   generating a configuration path sentence corresponding to a valid path of a first configuration tree for the first configuration, in which the valid path spans from a root node in the first configuration tree to a terminal or end node in the first configuration tree and a token is inserted in the configuration path sentence when an input is expected; and
   generating a configuration path sentence corresponding to a valid path of a second configuration tree for the second configuration, in which the valid path spans from a root node in the second configuration tree to a terminal or end node in the second configuration tree and a token is inserted in the configuration path sentence when an input is expected.

10. The information handling system of claim 9 wherein the trained neural network language model that converts the configuration path sentence of the first set of configuration path sentences into the representation is a same trained neural network language model that converts the configuration path sentence of the second set of configuration path sentences into the representation.

11. The information handling system of claim 8 wherein the comparison technique is a Wasserstein distance-based Optimal transport to obtain a minimum cost mapping between the first and second difference matrices.

12. The information handling system of claim 8 wherein the comparison valuation is a scalar value.

13. The information handling system of claim 12 wherein the non-transitory computer-readable medium or media further comprises one or more sets of instructions which, when executed by at least one of the one or more processors, causes steps to be performed comprising:
   correlating the comparison valuation to a configuration difference label based upon the scalar value and a set of one or more threshold values; and
   identifying one or more actions corresponding to the correlated configuration difference label.

14. The information handling system of claim 8 wherein the non-transitory computer-readable medium or media further comprises one or more sets of instructions which, when executed by at least one of the one or more processors, causes steps to be performed comprising:
   responsive to a number of elements in the first difference matrix being different than a number of elements in the second difference matrix, filling whichever difference matrix has fewer elements with filler elements so that each difference matrix has the same number of elements.

15. A non-transitory computer-readable medium or media comprising one or more sequences of instructions which, when executed by at least one processor, causes steps to be performed comprising:

encoding, using a trained neural network language model, each configuration path sentence from a first set of configuration path sentences related to a first configuration into a first set of representations, in which the trained neural network language model converts the configuration path sentence into the representation;

encoding, using a trained neural network language model, each configuration path sentence from a second set of configuration path sentence related to a second configuration into a second set of representations, in which the trained neural network language model converts the configuration path sentence into the representation;

for the first set of representations, generating a first difference matrix, which represents pair-wise comparisons between each representation in the first set of representations and every other representation in the first set of representations;

for the second set of representations, generating a second difference matrix, which represents pair-wise comparisons between each representation in the second set of representations and every other representation in the second set of representations; and generating a comparison valuation using a comparison technique to gauge difference between the first difference matrix with the second difference matrix.

16. The non-transitory computer-readable medium or media of claim 15 wherein the first set of configuration path sentences and the second set of configuration path sentences are obtained by performing steps comprising:

generating a configuration path sentence corresponding to a valid path of a first configuration tree for the first configuration, in which the valid path spans from a root node in the first configuration tree to a terminal or end node in the first configuration tree and a token is inserted in the configuration path sentence when an input is expected; and generating a configuration path sentence corresponding to a valid path of a second configuration tree for the second configuration, in which the valid path spans from a root node in the second configuration tree to a terminal or end node in the second configuration tree and a token is inserted in the configuration path sentence when an input is expected.

17. The non-transitory computer-readable medium or media of claim 16 wherein:

the trained neural network language model that converts the configuration path sentence of the first set of configuration path sentences into the representation is a same trained neural network language model that converts the configuration path sentence of the second set of configuration path sentences into the representation.

18. The non-transitory computer-readable medium or media of claim 15 wherein the comparison technique is a Wasserstein distance-based Optimal transport to obtain a minimum cost mapping between the first and second difference matrices.

19. The non-transitory computer-readable medium or media of claim 15 wherein the comparison valuation is a scalar value.

20. The non-transitory computer-readable medium or media of claim 19 wherein the non-transitory computer-readable medium or media further comprises one or more sets of instructions which, when executed by at least one of the one or more processors, causes steps to be performed comprising:

correlating the comparison valuation to a configuration difference label based upon the scalar value and a set of one or more threshold values; and identifying one or more actions corresponding to the correlated configuration difference label.

\* \* \* \* \*